United States Patent Office 3,390,149
Patented June 25, 1968

3,390,149
PROCESS FOR THE PRODUCTION OF
β-QUINOPHTHALINES
Joachim Kranz, Ludwigshafen (Rhine), and Wolfgang Gerstner, Heidelberg, Germany, assignors to Badische Anilin- & Soda-Fabrik Aktiengesellschaft, Ludwigshafen (Rhine), Germany
No Drawing. Filed Sept. 22, 1965, Ser. No. 489,399
Claims priority, application Germany, Sept. 25, 1964, B 78,669; Apr. 3, 1965, B 81,294; July 22, 1965, B 82,950
8 Claims. (Cl. 260—240.7)

ABSTRACT OF THE DISCLOSURE

Process for the production of β-quinophthalines by reacting a phthalodinitrile with aqueous alcoholic hydrochloric acid to form a 3-iminophthalimidine which after isolation is in turn reacted with α-picoline, a quinaldine or a benzoquinaldine.

---

β-Aminophthalines are compounds of the formula:

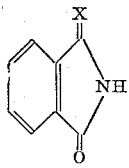

wherein X represents a radical of the picoline, quinaldine or benzoquinaldine series. Compounds of this type, especially β-quinophthalines wherein X represents the radical of quinaldines, have been described in the prior art. These β-quinophthalines are obtained according to Liebigs Annalen der Chemie, vol. 315, 350 (1901), and Ber., 2310 (1901) only by reacting phthalimide with quinoline in the presence of zinc chloride. The yields in this reaction are very low and the reaction product is difficult to purify. It has furthermore already been described to react thiophthalimide and quinaldine with the evolution of hydrogen sulfide. The thiophthalimide used as starting material can be obtained in two steps by the reaction of phthalodinitrile with alcohol, sodium sulfide, and hydrogen sulfide. Cyano-thiobenzamide is thus obtained which on boiling with hydrochloric acid yields the thiophthalimide. On working up the cyano-thiobenzamide reaction mixture, hydrogen sulfide is again evolved. The evolution of hydrogen sulfide during a chemical reaction intended for production on an industrial scale is, however, highly undesirable. Furthermore, the reaction gives relatively low yields.

It is, therefore, one object of the invention to provide a process which does not involve the evolution of hydrogen sulfide. A further object of the invention is the preparation of β-quinophthalines directly in a pure form and in a high yield. A still further object of the invention resides in a process for the production of β-quinophthalines which are highly useful as U.V.-fluorescent pigments in combination with a carrier such as polyvinyl chloride. Further objects of the invention will be apparent from the description.

These objects are achieved by reacting phthalodinitrile and substitution products thereof with an aqueous alcoholic solution of hydrogen chloride to form 3-iminophthalimidine hydrochloride which in turn is reacted with a picoline or quinoline. In this manner, β-quinophthalines are obtained with high yields and purity.

In particular the invention relates to a process for the production of quinophthalines of the general formula:

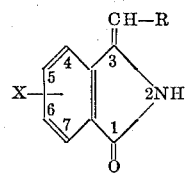

wherein X represents a member selected from the group consisting of a chlorine atom, a nitro group and a phenyl group and R represents a radical of the pyridine, quinoline or 5,6-benzoquinoline series, the 2-position of which is attached to the phthalimidine via the CH group, which process comprises reacting a phthalodinitrile of the formula:

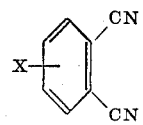

wherein X has the above meaning, with aqueous alcoholic hydrochloric acid to form the 3-iminophthalimidine hydrochloride and condensing the imino intermediate thus obtained with a compound of the formula R—CH₃ wherein R has the above meaning. Phthalodinitriles to be used according to the invention are for example chloro substituted dinitriles such as 4-chlorophthalodinitrile, 4-nitrophthalodinitrile, 4-phenylphthalodinitrile and particularly unsubstituted phthalodinitrile.

Compounds of the pyridine, quinoline and benzoquinoline series are meant to include compounds having inert substituents. Inert substituents are those which do not interfere with the reaction, e.g. halogen atoms such as chlorine atoms, hydroxy groups, alkoxy groups such as methoxy or ethoxy groups, nitro groups, and above all alkyl groups such as methyl groups. As compounds R—CH₃ to be condensed with the 3-iminophthalimidine hydrochlorides there may be mentioned specifically α-picoline, quinaldine, 2,6-dimethylquinoline and 5,6-benzoquinaldine.

The conversion of phthalodinitrile and substitution products thereof into the corresponding 3-iminophthalimidine hydrochlorides is carried out for example by stirring it while dispersed in aqueous alcoholic hydrochloric acid, the latter preferably being present in excess, for example in a 3 to 5 fold excess, for several hours at room temperature or slightly elevated temperature, for example up to 60° C. Higher temperatures than 60° C. can also be used but do not lead to higher yields of the imino product. For the aqueous alcoholic hydrochloric acid there come into consideration above all low molecular weight alcohols, for example, the lower alkanols having 1 to 4 carbon atoms. Thus, methyl alcohol, ethyl alcohol and particularly isobutyl alcohol may be used. The water content of the alcohols can vary within a comparatively wide range, advantageously between 1 and 10% by weight. The hydrochloric acid is as a rule introduced into the aqueous alcohol by passing in a stream of gaseous hydrogen chloride. Advantageously the alcoholic solution is saturated with the hydrochloric acid in order to obtain the highest yield of the imino compounds possible. An aqueous alcoholic solution of hydrochloric acid which contains for example less than the amount of hydrochloric acid necessary for saturation can be used as well, although the yield of the intermediate may decrease slightly. The 3-iminophthalimidine hydrochlorides are obtained by this reaction in practically quantitative yields and are formed in a very pure state. After isolation of this product, the mother liquor together with alcohol used for the washing of the filtered compound and brought to the original volume may be reused.

The 3-iminophthalimidine hydrochloride or its derivatives thus obtained may be reacted with the α-picolines or quinaldines with or without diluents to form the quinophthaline. It is advantageous to react the components in stoichiometric amounts. Deviations from the stoichiometric ratio are possible without substantial disadvantage; especially when the reaction is carried out in the absence of a solvent, an excess of the α-picoline or quinaldine may be used as solvent. Liquids which are inert under the reaction conditions are also suitable as solvents. Examples of several of these inert organic solvents are: isobutanol, methyl glycol, N-methylpyrrolidone and dimethylformamide. As the reaction temperature for the condensation of the imino compounds with the picolines or quinaldines, a range from about 60° to 200° C. should be chosen. A temperature somewhat higher than 200° C. is also suitable. The preferred temperature range for convenient production of the quinophthalines is about 120° to 140° C.

The final compounds obtained according to this invention are extremely useful for the preparation of pigments which fluoresce in U.V. light, especially pigments which fluoresce at the longer wave lengths of the spectral range. There are only a few colorless fluorescing pigments known so far which fluoresce in U.V. light with a yellow to red irradiation.

It has also been found that mixtures of colorless organic resins with β-quinophthalines obtainable according to the invention are excellent U.V. light fluorescing pigments which are colorless in the daylight. These pigments contain as the carrier for the fluorescing compound one or several colorless organic resins which should be substantially insoluble in organic solvents. For example the following organic resins can be mentioned: polyvinyl chloride and polyacrylonitrile or urea formaldehyde and melamine formaldehyde resins. The pigments contain the β-quinophthalines according to the invention in a finely divided state. The concentration of the β-quinophthalines in the mixture should be 0.1 to 3% by weight, preferably 0.5 to 2% by weight. The fluorescing composition may contain, besides the resins and the β-quinophthalines, small amounts of another compound known to be capable of fluorescing in U.V. light. In this manner, a shading of the yellow fluorescent irradiation can be achieved. For instance, by addition of 4-aminonaphthalic acid-N-butylimide, a brightening of the fluorescent irradiation is obtained. These compositions are practically colorless in daylight. They exhibit a surprisingly intensive fluorescence, a high light fastness, and good alkali resistance.

The pigment compositions are obtained in a manner known per se. For instance, a solution of one or several of the β-quinophthalines is added to an aqueous dispersion of the resin, the mixture is heated while stirring, and the pigment filtered off and dried.

The parts in the examples are parts by weight. Parts by volume correspond to parts by weight as does the liter to the kilogram under standard conditions.

EXAMPLE 1

A suspension of 256 parts of phthalodinitrile in 1580 parts (=2000 parts by volume) of 96% ethanol is saturated with hydrogen chloride while stirring, and then allowed to stand for ten hours. The pale yellow crystals are suction filtered, washed with 80 to 150 parts of ethanol to remove adherent hydrogen chloride and dried at 60° to 70° C. The yield is 211 to 263 parts (58 to 72% of the theory) of iminophthalimidine hydrochloride in the form of yellowish water-soluble crystals which decompose at between 240° and 150° C.

EXAMPLE 2

18.3 parts of iminophthalimidine hydrochloride is heated for one hour at 120° C. in 30 parts of α-picoline. The reaction mixture is poured into 300 parts of water and 17 parts (76.5% of the theory) of the compound having the formula:

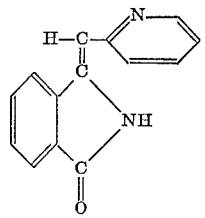

is obtained as yellow crystals having a melting point of 111° to 112° C.

EXAMPLE 3

A mixure of 91 parts of iminophthalimidine hydrochloride, 85 parts of quinaldine and 50 parts of N-methylpyrrolidone is stirred for one hour at 140° C. The mixture is poured into water and the precipitated product is isolated in the usual way. 119 parts (87.5% of the theory) of a compound having the formula:

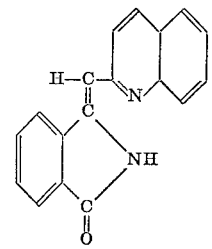

is obtained as yellow-orange crystals having a melting point of 215° to 217° C.

EXAMPLE 4

A mixture of 36.5 parts of iminophthalimidine hydrochloride and 60 parts of 2,6-dimethylquinoline is stirred for one hour at 200° C. The mixture is cooled to 50° C. and diluted with 150 parts of 50% methanol, 51 parts (89% of the theory) of the compound having the formula:

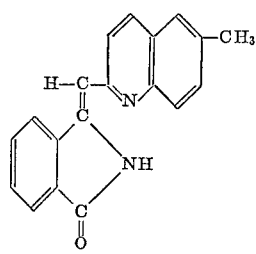

is obtained as orange-yellow crystals having a melting point of 200° to 201° C.

EXAMPLE 5

A suspension of 128 parts of phthalodinitrile in a mixture of 760 parts of isobutanol and 50 parts of water is saturated with hydrogen chloride while stirring. The whole is allowed to stand for ten hours and the pale yellow crystals are suction filtered, washed with 50 to 100 parts of isobutanol to remove adherent hydrogen chloride and dried at 60° to 70° C. The yield is 167 parts (91.5% of the theory) of iminophthalimidine hydrochloride in the form of yellowish water-soluble crystals which decompose at from 240° to 250° C.

By introducing 128 parts of phthalodinitrile into the filtrate, replenished by the isobutanol used for washing, and saturating the mixture with hydrogen chloride, 172 to 175 parts (94 to 96% of the theory) of iminophthalimidine hydrochloride having a melting point of 245° to 250° C. (with decomposition) is obtained.

EXAMPLE 6

(a) A mixture of 91 parts of the iminophthalimidine hydrochloride obtained according to Example 5, 85 parts of quinaldine and 50 parts of isobutanol is stirred for two to four hours at 120° C. and allowed to cool to room temperatured. The deposited product is suction filtered, washed with dilute (2%) sulfuric acid and then with water until neutral. The product is dried. 120 parts (88.2% of the theory with reference to iminophthalimidine hydrochloride) of the same compound as in Example 3 is obtained as yellow orange crystals having a melting point of 216° to 218° C.

(b) 91 parts of iminophthalimidine hydrochloride and 80 parts of quinaldine are heated for thirty minutes at 130° to 140° C. The crystal mash which has become thick is stirred with 100 parts of methanol or isobutanol while it is still warm (60° C.), allowed to cool, suction filtered, washed with water until free from salt and dried. The yield is 121 parts (89% of the theory with reference to iminophthalimidine hydrochloride). The melting point is 218° to 219° C.

EXAMPLE 7

A suspension of 173 parts of 4-nitrophthalodinitrile in a mixture of 680 parts of isobutanol and 20 parts of water is saturated with hydrogen chloride while stirring and the whole is worked up as described in Example 5.

213 parts (93.6% of the theory) of 4-nitroiminophthalimidine hydrochloride is obtained in the form of colorless, water-soluble crystals which melt between 250° and 260° C. The compound has the formula:

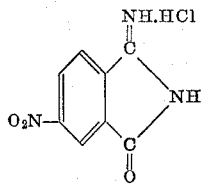

If another 173 parts of 4-nitrophthalodinitrile be introduced into the filtrate, replenished by the isobutanol used for washing, and the whole be saturated with hydrogen chloride, analogous working up results in 210 to 215 parts (92 to 95% of the theory) of 4-nitroiminophthalimidine hydrochloride having a melting point of 250° to 260° C. with decomposition.

EXAMPLE 8

A mixture of 45.5 parts of the 4-nitroiminophthalimidine hydrochloride obtained according to Example 7, 40 parts of 5,6-benzoquinaldine and 30 parts of N-methyl-pyrrolidone is heated to 130° C. while stirring, the thin crystal suspension thus solidifying to a yellow crystal mash with a rise in temperature to 150° C. The reaction mixture is cooled and diluted with 100 parts of 50% methanol and the reaction product is suction filtered and dried. 68.7 parts (93.6% of the theory with reference to the hydrochloride) of the compound having the formula:

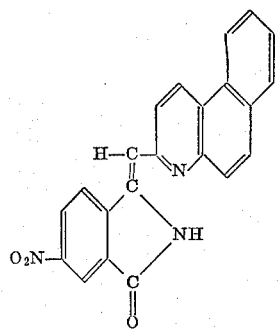

is obtained as yellowish crystals having a melting point of 363° to 365° C.

EXAMPLE 9

Using the procedure of Example 7, 204 parts of 4-phenylphthalodinitrile is used instead of 173 parts of 4-nitrophthalodinitrile. 240 parts (93% of the theory) of 4-phenyliminophthalimidine hydrochloride is obtained in the form of colorless water-soluble crystals which decompose at from 240° to 250° C. The compound has the following formula:

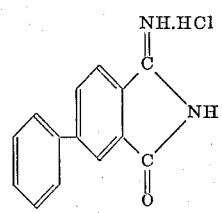

EXAMPLE 10

The procedure of Example 8 is followed but using 52 parts of 3-phenyliminophthalimidine hydrochloride instead of 45.5 parts of 4-nitroiminophthalimidine hydrochloride. 74.6 parts (93.2% of the theory with reference to the hydrochloride) of the compound having the formula:

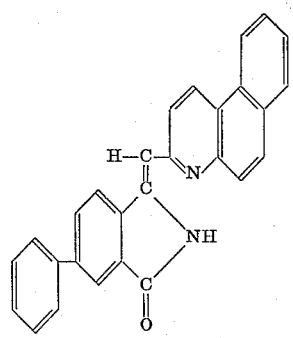

is obtained as yellow orange crystals having a melting point of 319° to 322° C.

EXAMPLE 11

200 parts of polyvinyl chloride powder having an average particle size of 2μ is suspended in 15,000 parts of water. 5 parts of the β-quinophthaline of the formula:

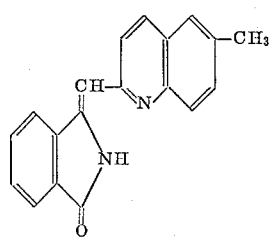

in 1,000 parts by volume ethylene glycol monoethyl ether is added to this suspension with vigorous stirring and the mixture is heated at 75° C. for five hours.

The mixture is cooled to room temperature and the fluorescent pigment is filtered off, washed with water and dried. The pigment thus obtained exhibits in U.V. light a very intensive fluoroscence with a maximum at approximately 600μ and with only an immaterial decrease of intensity up to 700μ. The pigment can for example be incorporated in a nitro lacquer to form a fluorescent lacquer which yields colorings on paper having high light fastness. Pigments having similar properties are obtained if polyacrylonitrile powder or urea formaldehyde or melamine formaldehyde resins are used.

EXAMPLE 12

Five parts of a β-quinophthaline of the formula:

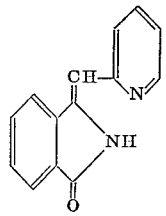

and 2.5 parts 4-aminonaphthalic acid-n-butylimide in 500 parts of N-methylpyrrolidone is added with stirring to a suspension of 100 parts polyvinyl chloride having a particle size of approximately 0.1μ in 2,500 parts of water. The mixture is heated to 60° C., and this temperature is maintained for 8 hours with stirring. After cooling down to room temperature the pigment is filtered by suction, washed with water, and dried at 50° C. The fluorescent pigment thus obtained exhibits an intensive fluorescence in U.V. light.

We claim:

1. A process for the production of a β-quinophthaline of the formula:

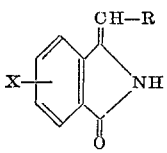

wherein X represents a member selected from the group consisting of hydrogen, chlorine, nitro and phenyl and R represents a radical selected from the group consisting of the pyridine, the quinoline and the 5,6-benzoquinoline series, the corresponding 2-position of said radicals being attached to the phthalimidine via the CH group, which process comprises reacting a phthalodinitrile of the formula:

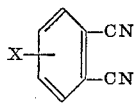

wherein X has the above meanings with aqueous alcoholic hydrochloric acid to form the corresponding 3-iminophthalimidine hydrochloride, isolating this imino intermediate and reacting it with a compound of the formula R—CH₃ wherein R has the meanings given above.

2. A process for the production of a β-quinophthaline of the formula:

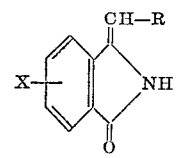

wherein X represents a member selected from the group consisting of hydrogen, chlorine, nitro and phenyl and R represents a radical selected from the group consisting of pyridyl-(2), quinolyl-(2), 6-methylquinolyl-(2) and 5,6-benzoquinolyl-(2), which comprises reacting a phthalodinitrile of the formula:

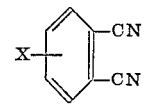

wherein X has the above meaning with aqueous acoholic hydrochloric acid to form the corresponding 3-iminophthalimidine hydrochloride, isolating this imino intermediate and reacting it with a compound of the formula R—CH₃, wherein R has the meaning given above.

3. A process according to claim 1 wherein isobutyl alcohol is used in the aqueous alcoholic hydrochloric acid.

4. A process according to claim 1 wherein phthalodinitrile is converted into the 3-iminophthalimidine hydrochloride and the imino compound thus obtained is condensed with quinaldine.

5. A process according to claim 1 wherein phthalodinitrile is converted into the 3-iminophthalimidine hydrochloride and the imino compound thus obtained is condensed with 2,6-dimethylquinoline.

6. A process according to claim 1 wherein the 3-iminophthalimidine hydrochloride is reacted at about 60° to 200° C. with a compound R—CH₃ wherein R represents a radical selected from the group consisting of the pyridine, quinoline and 5,6-benzoquinoline series, the methyl group being attached to the 2-position of said radicals.

7. A process according to claim 6 wherein said 3-iminophthalimidine hydrochloride is reacted with said compound of the formula R—CH₃ in an inert organic solvent.

8. A process according to claim 6 wherein said 3-iminophthalimidine hydrochloride is reacted with an excess of said compound of the formula R—CR₃.

References Cited
UNITED STATES PATENTS
3,320,279    5/1967    Brack _____ 260—288 X NICHOLAS S. RIZZO, *Primary Examiner.*

D. G. DAUS, *Assistant Examiner.*

UNITED STATES PATENT OFFICE
CERTIFICATE OF CORRECTION

Patent No. 3,390,149                                              June 25, 1968

Joachim Kranz et al.

It is certified that error appears in the above identified patent and that said Letters Patent are hereby corrected as shown below:

Column 3, line 72, "150° C." should read -- 250° C. --.
Column 7, line 41, before "2-position" cancel "corresponding".
Column 8, line 47, "CR$_3$" should read -- CH$_3$ --.

Signed and sealed this 16th day of December 1969.

(SEAL)
Attest:

Edward M. Fletcher, Jr.                               WILLIAM E. SCHUYLER, JR.
Attesting Officer                                           Commissioner of Patents